Sept. 20, 1971  H. STALLMANN  3,606,143
DAMPING DEVICE FOR A CENTRIFUGE ROTOR
Filed Feb. 25, 1969
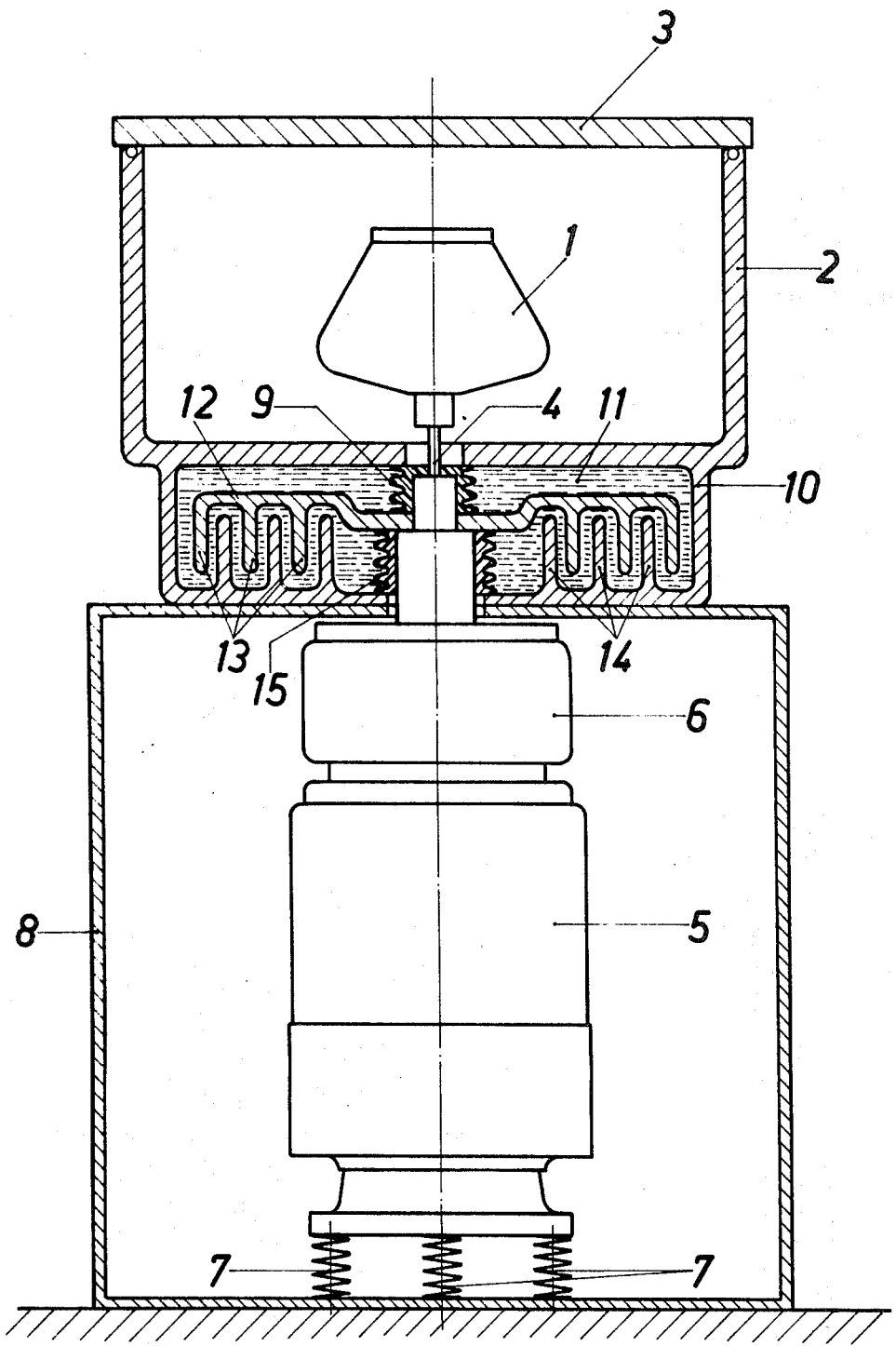
INVENTOR:
Hans Stallmann United States Patent Office 3,606,143
Patented Sept. 20, 1971

3,606,143
DAMPING DEVICE FOR A CENTRIFUGE ROTOR
Hans Stallmann, Osterode, Germany, assignor to
Heraeus-Christ G.m.b.H., Osterode, Germany
Filed Feb. 25, 1969, Ser. No. 801,939
Claims priority, application Germany, Mar. 1, 1968,
P 16 57 276.2
Int. Cl. B04b 9/00
U.S. Cl. 233—23            10 Claims

ABSTRACT OF THE DISCLOSURE

A device for damping lateral vibrations of the rotor of a high-speed centrifuge which is mounted on the upper end of a vertical drive shaft and rotatable within a chamber on the upper side of a container which, in turn, is secured to the top of a stationary frame in which the drive unit for the rotor is resiliently mounted. The container is filled with a damping fluid and contains a damping plate which is centrally secured to a hublike bushing which projects from the drive unit into the container and from which, in turn, the drive shaft projects. This damping plate is provided at least on one side with projections which, when the damping plate is moved especially by lateral vibrations, tend to displace the damping fluid within the container. These projections are preferably cylindrical, extending from the damping plate coaxially to the drive shaft toward one horizontal wall of the container. To increase the damping effect, this wall preferably also carries similar projections which extend into the gaps between the adjacent projections on the damping plate and are laterally spaced therefrom.

---

The present invention relates to a device for damping lateral vibrations of the rotor of a centrifuge which is mounted on the upper end of a vertical drive shaft, and which may occur relative to the stationary frame of the centrifuge.

There are high-speed centrifuges or ultracentrifuges known of a type in which a relatively large rotor is mounted on a slightly flexible drive shaft of a relatively small diameter. During the operation of the centrifuge this drive shaft is driven at a high speed by a drive unit, which may consist, for example, of a motor and a gear transmission and is resiliently supported on the frame of the centrifuge. By employing such a relatively thin drive shaft the result may be attained that the center of gravity of the combined mass of the rotor and the substance to be centrifuged will be located within the axis of rotation. Although in the manufacture of rotors the greatest care is taken to insure that the actual center of inertia or mass coincides in each case with the geometrical axis of the rotor, they are generally shifted slightly relative to each other, especially when the rotor is not loaded exactly symmetrically. The rotor is then given a noticeable tumbling or wobbling movement or instability when its speed is increased. This tumbling movement also occurs when the rotor is slowed down from a high speed to one below a certain limit. Apart from the fact that due to the tumbling movement the thin drive shaft of the rotor is subjected to increased bending stresses, the tumbling movement also causes the disadvantage that at strong deflections of the rotor the sediment which has already been separated from a liquid by centrifuging it at a high speed will become remixed with the liquid.

It is an object of the present invention to provide a device for damping the lateral vibrations of the rotor of a centrifuge which is mounted on the upper end of a vertical drive shaft, and to design this device so as to be of a single construction and not to require any means or manipulations by the operator of the centrifuge which render it more difficult for him to fill and empty the rotor.

For attaining this object, the invention provides a device for damping the lateral vibrations which the rotor of a centrifuge and especially an ultracentrifuge, which is mounted on the upper end of a vertical drive shaft and is enclosed within a chamber, may carry out relative to the stationary frame of the centrifuge. The drive shaft of this rotor projects upwardly from a drive unit which is resiliently mounted within the frame. The damping device according to the invention comprises a container which is located underneath the chamber containing the rotor and is rigidly secured to the frame and is filled completely with a damping fluid in which a damping plate is submerged which is centrally secured to a fixed part of the drive unit projecting into the chamber and has an uneven surface at least on one side which offers a resistance to its displacements within the damping fluid which are caused especially by lateral vibrations of the rotor and its drive shaft. The damping effect may be increased by providing at least one side of the damping plate with at least one cylindrical projection which extends coaxially to the drive shaft and is surrounded by the damping fluid. One embodiment of the invention which has proved to be very successful consists in providing a plurality of such cylindrical projections at least on one side of the damping plate so as to extend coaxially to each other and to the drive shaft.

According to another feature of the invention, at least one wall of the container of the damping fluid which extends at right angles to the axis of the drive shaft is likewise provided with at least one cylindrical wall-like projection which is coaxial to the drive shaft and projects into the damping fluid in the direction opposite to the similar projection on the damping plate and is laterally offset from the latter projection. The free ends of the associated cylindrical projections on the damping plate and on the container wall extend to points which are spaced at a relatively small distance from the container wall or the damping plate, respectively.

According to a preferred embodiment of the invention, at least one side of the damping plate and one container wall facing this side of the damping plate are provided with a plurality of cylindrical wall-like projections which are all substantially coaxial and extend in opposite direction to each other so that the projections on one of these elements project into the gaps between the projections on the other element. All adjacent projections of both elements are preferably spaced substantially equally from each other and the free ends of the projections of one element are likewise spaced equally from the bottoms of the gaps between the projections on the other element.

The damping fluid which fills the entire area of the container which is not taken up by the damping plate and the cylindrical projections may consist, for example, of a highly viscous liquid.

The damping device according to the present invention has the great advantage over other damping devices for centrifuges as were previously known, that it is of a very simple construction and that, since it is located underneath the rotor within a separate chamber or container, it does not interfere with or even affect the operations of filling and emptying the rotor or exchanging it for another. For the same reason, the damping device also does not increase the difficulties of cleaning the rotor or of sterilizing the chamber in which it is rotatable, for example, in the event that during the centrifuging of an infectious substance some of this substance might be spilled out of the cup-shaped rotor.

The features and advantages of the present invention will become more clearly apparent from the following detailed description thereof which is to be read with reference to the accompanying drawing which shows a vertical axial section of the centrifuge.

In this drawing, the rotor of the centrifuge into which the specimen or substance to be centrifuged is to be inserted is designated by the numeral 1. This rotor 1 is located within a chamber 2 which may be hermetically closed by a removable cover 3 and is adapted to be evacuated, for example, by being connected to a vacuum pump, not shown. By means of a resiliently flexible drive shaft 4, rotor 1 may be driven by a drive unit which consists of a motor 5 and a gear transmission 6. This drive unit 5, 6 is supported by springs 7 relative to the frame 8 of the centrifuge. This spring support in connection with the flexible drive shaft 4 normally insures a steady rotation of the rotor 1 about its center of inertia when the rotor is driven even at very high speeds. Detrimental lateral vibrations of the rotor may, however, occur especially when the speed of the rotor enters the range of the natural frequency of the vibratory system which is formed by the elastically connected masses of the rotor 1 and the driving unit 5, 6. Within this critical speed range only a very small imbalance of the rotor will already cause resonance, that is, a strong vibratory movement of the drive units, which, in turn, results in vibration amplitudes of the rotor, that is, lateral vibrations of the latter. According to the invention, these undesirable lateral vibrations of the rotor 1 may be almost completely prevented without affecting the high-speed rotation of the rotor by the provision of a damping device which is located underneath the rotor chamber 2.

As illustrated in the drawing, the damping device according to the invention comprises a container 10 which is filled with a damping fluid 11 and is firmly secured at one side to the chamber 2 and at the other side to the frame 8 of the centrifuge. Although it is necessary to secure the container 10 rigidly to the frame 8, it is not absolutely necessary to secure it rigidly to the chamber 2, but it may also be connected to the latter in another manner. The damping device further comprises a damping plate 12 which is firmly secured to the upper part of the gear transmission 6 and is completely surrounded by the damping fluid 11. Damping plate 12 has integrally thereon a plurality of cylindrical projections 13 which are coaxial to each other and to the drive shaft 4 and project into the damping fluid 11 in the direction toward the bottom of the container 10. This bottom is provided with a corresponding number of cylindrical projections 14 which are likewise coaxial to each other and to the drive shaft 4 and project centrally into the gaps between the adjacent projections 13 which are filled with the damping fluid 11. The projections 13 and 14 are thus equally spaced from each other. The evacuated chamber 2 is tightly sealed by an elastic sealing member 9 relative to the area underneath this chamber which is under atmospheric pressure. The thin flexible drive shaft 4 is also sealed vacuum-tight below the point where it emerges from the transmission 6. The manner and means for sealing the drive shaft may be of a conventional type and are therefore not shown. Between the damping plate 12 and the bottom of the container 10 a further elastic sealing member 15 is provided so that the container 10 which is filled with the damping fluid 11 is hermetically sealed. If the drive unit 5, 6 carries out lateral movements, these movements are also transmitted to the damping plate 12 and its cylindrical projections 13 but they are considerably damped by the resulting displacement of the damping fluid 11 from the chambers between the projections 13 and 14.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A centrifuge having, in combination, a stationary frame, a chamber mounted on said frame, a drive unit having a housing resiliently mounted in said frame and having a vertical drive shaft projecting therefrom into said chamber, a vessel forming a rotor removably secured to the upper end of said drive shaft and rotatable within said chamber, and damping means interposed between said chamber and said frame and comprising a container connected to said chamber and rigidly secured to said frame and having a central aperture in each of two opposite walls thereof, said walls extending substantially transverse to the axis of said drive shaft, said housing of said drive unit having an upper part projecting through at least one of said apertures into said container, sealing means for closing said apertures relative to the inside of said container, said damping means further comprising a damping plate within said container and centrally secured to said projecting housing part of said drive unit and extending substantially transverse to the axis of said drive shaft and having means projecting from at least one side thereof, and a damping fluid filling said container and surrounding said damping plate, including said projecting means, said damping plate including said projecting means tending to displace said damping fluid in said container at least when lateral vibrations of said rotor and drive shaft occur relative to said frame during the rotation of said rotor.

2. A centrifuge as defined in claim 1, in which said projecting means on said damping plate comprise at least one cylindrical projection substantially coaxial to said drive shaft on at least one side of said plate and extending toward but terminating at a small distance from one of said walls of said container.

3. A centrifuge as defined in claim 2, in which said damping means further comprise at least one cylindrical projection on at least one of said walls of said containers and projecting toward the side of said damping plate carrying said first cylindrical projection and terminating at a small distance from said side and being coaxially to but laterally spaced from said first cylindrical projection.

4. A centrifuge as defined in claim 1, in which said projecting means on said damping plate comprise a plurality of cylindrical projections substantially coaxial to each other and to said drive shaft on at least one side of said plate and extending toward but terminating at a small distance from one of said walls of said container.

5. A centrifuge as defined in claim 4, in which each of said cylindrical projections on at least one side of said damping plate is spaced laterally from the adjacent projection on said side, said damping means further comprising a plurality of cylindrical projections on at least one of said walls of said container and substantially coaxial to each other and projecting into the gaps between said projections on said plate and laterally spaced from said projections and terminating at a small distance from the bottoms of said gaps.

6. A centrifuge as defined in claim 5, in which all of said projections on one side of said plate are laterally spaced at substantially the same distance from the adjacent projections on one wall of said container.

7. A centrifuge as defined in claim 5, in which all of said projections on one side of said plate are laterally spaced at substantially the same distance from the adjacent projections on one wall of said container, and all of said projections on said side of said plate and on said wall of said container also terminate at substantially said distance from the bottoms of the gaps into which they project.

8. A centrifuge as defined in claim 1, in which said damping means further comprise means projecting from at least one of said walls of said container toward the side of said plate carrying said first projecting means and terminating at a small distance from said side and being laterally spaced from said first projecting means.

9. A centrifuge as defined in claim 1, in which the upper wall of said container also forms the bottom wall of said chamber.

10. A centrifuge as defined in claim 1, in which said sealing means comprise elastic sealing elements for hermetically sealing said container toward said chamber, toward said driving unit, and toward the inside of said frame.

References Cited
UNITED STATES PATENTS

| | | |
|---|---|---|
| 2,827,229 | 3/1958 | Blum. |
| 3,050,239 | 8/1962 | Williams. |
| 3,101,322 | 8/1963 | Stallman. |
| 3,465,956 | 9/1969 | Beard. |

ROBERT W. JENKINS, Primary Examiner